United States Patent [19]

Cameron et al.

[11] Patent Number: 4,572,519

[45] Date of Patent: Feb. 25, 1986

[54] PACKING ASSEMBLY FOR USE IN A PLUNGER BORE

[75] Inventors: Donald C. Cameron; Homer V. Cobb; Fred M. Winn, all of Tulsa, Okla.

[73] Assignee: Dowell Schlumberger Incorporated, Tulsa, Okla.

[21] Appl. No.: 620,668

[22] Filed: Jun. 14, 1984

[51] Int. Cl.$^4$ ............................................. F16J 15/16
[52] U.S. Cl. ........................................ 277/124; 277/59
[58] Field of Search ........................... 277/59, 60, 124

[56] References Cited

U.S. PATENT DOCUMENTS

| 3,003,797 | 10/1961 | Gage | 277/124 |
| 3,586,341 | 6/1971 | Whittaker | 277/124 |
| 3,907,307 | 9/1975 | Maurer et al. | 277/124 |
| 4,283,062 | 8/1981 | Catanzaro et al. | 277/124 |
| 4,384,726 | 5/1983 | Meyer | 277/59 |

*Primary Examiner*—Robert I. Smith
*Attorney, Agent, or Firm*—L. Wayne White; V. Dean Clausen

[57] ABSTRACT

In plunger-type pumps a packing assembly is installed around the plunger to prevent fluid from leaking past the moving plunger. The packing assembly includes male and female adaptor rings, which are in face-to-face contact with the packing rings, but provide only a "sloppy" fit. The practice of this invention involves shaping the adaptor ring faces to conform precisely to the shape of the packing ring faces against which they are seated.

4 Claims, 2 Drawing Figures

PACKING ASSEMBLY FOR USE IN A PLUNGER BORE

BACKGROUND OF THE INVENTION

The invention relates to an improved packing assembly of the type used to prevent fluid leaks around a plunger. In a specific application, the packing assembly is used in plunger-type pumps.

In various well treating operations, such as hydraulic fracturing, fluids are pumped into the wellbore by plunger-type pumps, such as Triplex or Quintuplex pumps. On the suction stroke of the pump, each plunger is pulled along the plunger bore away from the valve chamber. At the end of the suction stroke, the plunger reverses direction and is pushed back along the bore toward the pump chamber, to displace incoming fluid through the outlet valves. Rings of packing material are installed in the plunger bore to prevent the incoming fluid from leaking past the plunger. Each of the packing rings, in cross-section, is shaped like a chevron, and each ring has a central groove on the front side which functions as a hinge. The rear of each packing ring, therefore, has a generally convex shape and the front face is of a generally concave shape. The bottom edge of each packing ring defines a lip which fits snugly against the plunger to provide the liquid-tight seal.

In one form of the packing assemblies now in use, the packing rings are set into the plunger bore in side-by-side relation. This structure is usually referred to as a single stack arrangement and generally includes about four packing rings. In front of the last packing ring in the stack is a metal (brass) female adaptor ring, a lubrication gland, a packing gland spacer, and a packing gland. The front face of the female adaptor ring has a generally concave shape, so that it can seat against the convex-shaped rear face of the first packing ring. Behind the first packing ring in the stack is a brass male adaptor ring. The rear face of the male adaptor ring has a generally convex shape, so that it can seat against the concave-shaped front face of the first packing ring.

Another arrangement of the packing rings is referred to as a double stack. This arrangement usually consists of two packing rings, with a female adaptor ring positioned in front of the last packing ring in the stack, a male adaptor ring positioned behind the first ring in the stack, and a male-female adaptor ring positioned between the two packing rings.

As the plunger moves back and forth in the plunger bore, on the suction and discharge strokes of the pump, the lips of the packing rings drag considerably. The adaptor rings keep the plunger concentric with the bore at the "fluid" end of the pump, and thus concentric with the packing rings. The adaptor rings also help to retain the integrity of the cross sectional dimensions of the packing rings. The adaptor rings now used in packing assemblies installed on plunger-type pumps have a serious defect which causes a wearing away of these rings, rather than increasing the life of the packing. For example, the concave-shaped front faces on the female adaptor rings now available are formed with a 90 degree angle, and the convex-shaped rear faces on the male adaptor rings are formed with either a 90 degree angle or an angle of 115 degrees. However, the packing rings now available have rear faces formed with an angle of either 110 degrees or 120 degrees, and the front faces of these rings form an angle of 90 degrees.

The big difference in the angle of the mating faces on the adaptor rings and the packing rings, makes it impossible to seat the adaptor rings snugly against the packing rings when the packing is installed in the plunger bore. In the packing assemblies now in use, therefore, there are wide gaps between the adaptor rings and the packing rings that allow the rings to wobble. This causes excessive wear on the packing as the plunger moves back and forth in the plunger bore. In some instances, the wear is severe enough to reduce the operating life of the packing to only a few hours.

In the practice of the present invention, the operating life of the packing is considerably improved by providing male and female adaptor rings with faces having an angle that precisely conforms to the corresponding angles formed on the faces of the various conventional packing rings now in use.

SUMMARY OF THE INVENTION

The packing assembly of this invention is designed for installation in the plunger bore of a machine, such as a pump. In one embodiment of the packing assembly, the structure includes a packing gland which fastens into one end of the plunger bore. A packing gland spacer is positioned adjacent to and in contact with the packing gland, and a lubrication gland is positioned adjacent to and in contact with the packing gland spacer. The packing structure is made up of at least two packing rings. Each ring has a front face with a concave shape and a central groove therein, of a concave shape, at the center of the front face. The rings in the stack are arranged such that the rear face of one ring is in contact with the front face of the next ring. In the present description of the invention, this arrangement is referred to as a unitary stack.

A female adaptor ring is positioned between the lubrication gland and the packing ring stack. This ring has a front face with a concave shape, which defines an angle exactly conforming to the angle defined by the convex shape of the front face of the last packing ring in the stack. The shape of the front face enables it to seat firmly against the rear face of the last packing ring. A male adaptor ring is positioned in front of the first packing ring in the stack. The rear face of this ring has a convex shape and it includes an integral rib member having a convex shape, at the center of the rear face. The convex shape of the rear face defines an angle which exactly conforms to the angle defined by the concave shape of the front face of the first packing ring. The convex shape of the adaptor ring also conforms exactly to the concave shape of the groove in the front face of the first packing ring in the stack, so that the rear face and the rib member of the male adaptor ring are able to seat firmly against the first packing ring.

In another embodiment of the invention, the packing assembly includes at least two packing rings which are separated within the stack. This structure, which is referred to in the present description as a separated stack, is made up of the same parts as the unitary stack, except for a male-female adaptor ring. In the separated stack, as more fully described herein, the male-female adaptor ring is positioned between the packing rings.

DESCRIPTION OF THE INVENTION

Figure 1:
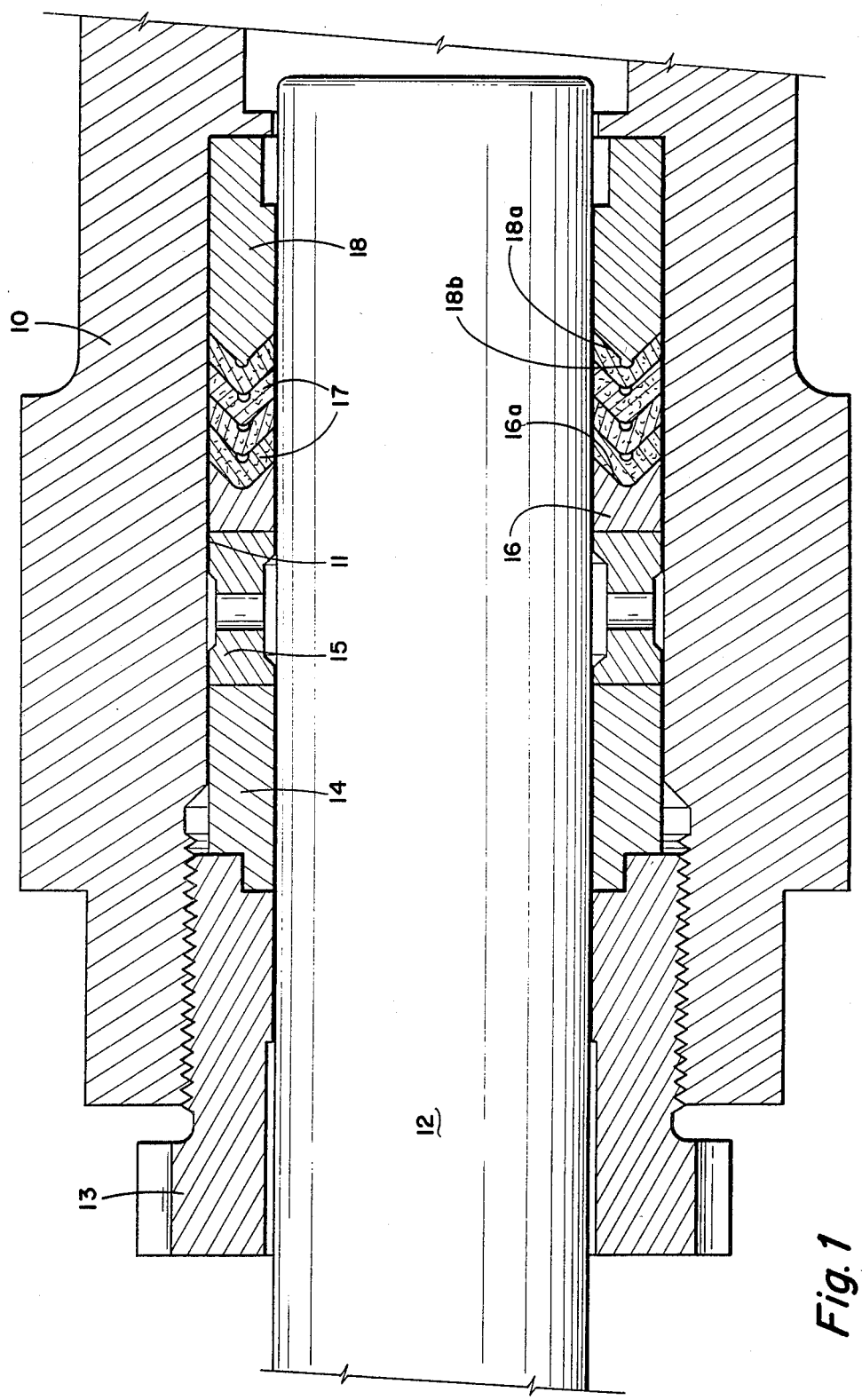
FIG. 1 is a front elevation view, mostly in section, of a packing assembly of this invention. The packing assembly is shown in its installed position in the plunger bore of a pump, with the packing rings being arranged in a unitary stack structure.

Referring to FIG. 1, the drawing illustrates a packing assembly of this invention in which the packing rings are arranged in a unitary stack (referred to in prior packing assemblies as a "single stack"). Numeral 10 refers generally to a housing member in a plunger-type pump. Inside of housing 10 is a bore, generally indicated by numeral 11. During the suction stroke of the pump, a slidable plunger 12 moves backwardly along bore 11 (to the left in FIG. 1), to draw fluid into the pump chamber (not shown). At the end of the suction stroke, plunger 12 reverses direction (to the right in FIG. 1) to displace the fluid from the chamber. Between the wall of bore 11 and the outside diameter of plunger 12 is a space, which is occupied by a packing assembly.

The packing assembly consists of several parts. One of these parts is a packing gland nut 13, which is threaded into the rear end of the plunger bore 11. The next part is a packing gland spacer 14, having a shoulder at one end, which fits against a corresponding shoulder on the packing gland. The next part is a lubrication gland 15, which fits against the spacer 14 at one end. The opposite end of gland 15 fits against the rear face of a female adaptor ring 16. The front face 16a of the female adaptor ring defines a concave shape.

The next part in the packing assembly is the unitary stack of packing rings, in which each packing ring is indicated by the numeral 17. The rear face of each packing ring 17, which faces toward the female adaptor ring 16, has a convex shape. The opposite, or front face of each packing ring defines a concave shape. Along the front face of each packing ring is a concave-shaped groove, positioned at the center of the front face. This central groove acts as a hinge to allow the packing ring to bend. The faces of the packing rings and the central groove are not identified by reference numerals, to avoid confusion in referring to the drawings. The packing rings form a fluid-tight seal at two places. One place is between the wall of bore 11 and the outside diameter of the packing rings. The other place is between the inside diameter of the packing rings and the outside diameter of plunger 12.

In FIG. 1, the unitary packing ring stack consists of four (4) rings, but the drawing is intended only to illustrate a typical packing ring stack. In practice, the number of rings in the unitary stack will vary according to design calculations and other factors. Another part in the packing assembly is a male adaptor ring 18, which is positioned in front of the first packing ring in the stack. The first packing ring has a front face 18a, which has a concave shape. The male adaptor ring also includes an integral rib 18b, which is positioned at the center of the rear face and is of a generally convex shape.

The packing rings 17 are commercially available parts which, as described earlier, are fabricated with a front face which defines an angle of either 110 degrees or 120 degrees, and the rear face of each ring defines an angle of 90 degrees. In the practice of this invention, therefore, the female adaptor ring is fabricated such that the concave-shaped front face 16a forms an angle of 90 degrees. This enables the front face 16a of the female adaptor ring to seat firmly against the rear face of the last packing ring in the stack. As part of the same invention, the male adaptor ring 18 is fabricated with the convex-shaped rear face 18a, which describes an angle of 110 degrees, or 120 degrees. In addition, the rib 18b is fabricated as an integral part of the rear face, and it has a convex shape which exactly conforms to the concave shape of the central groove (the hinge) in the first packing ring. The rib on the male adaptor ring, therefore, is a critical part of the present invention, which enables the ring to seat firmly against the front face of the first packing ring. This is a distinct advantage over conventional packing arrangements, which do not have a rib or similar member on the face of the adaptor rings.

Figure 2:
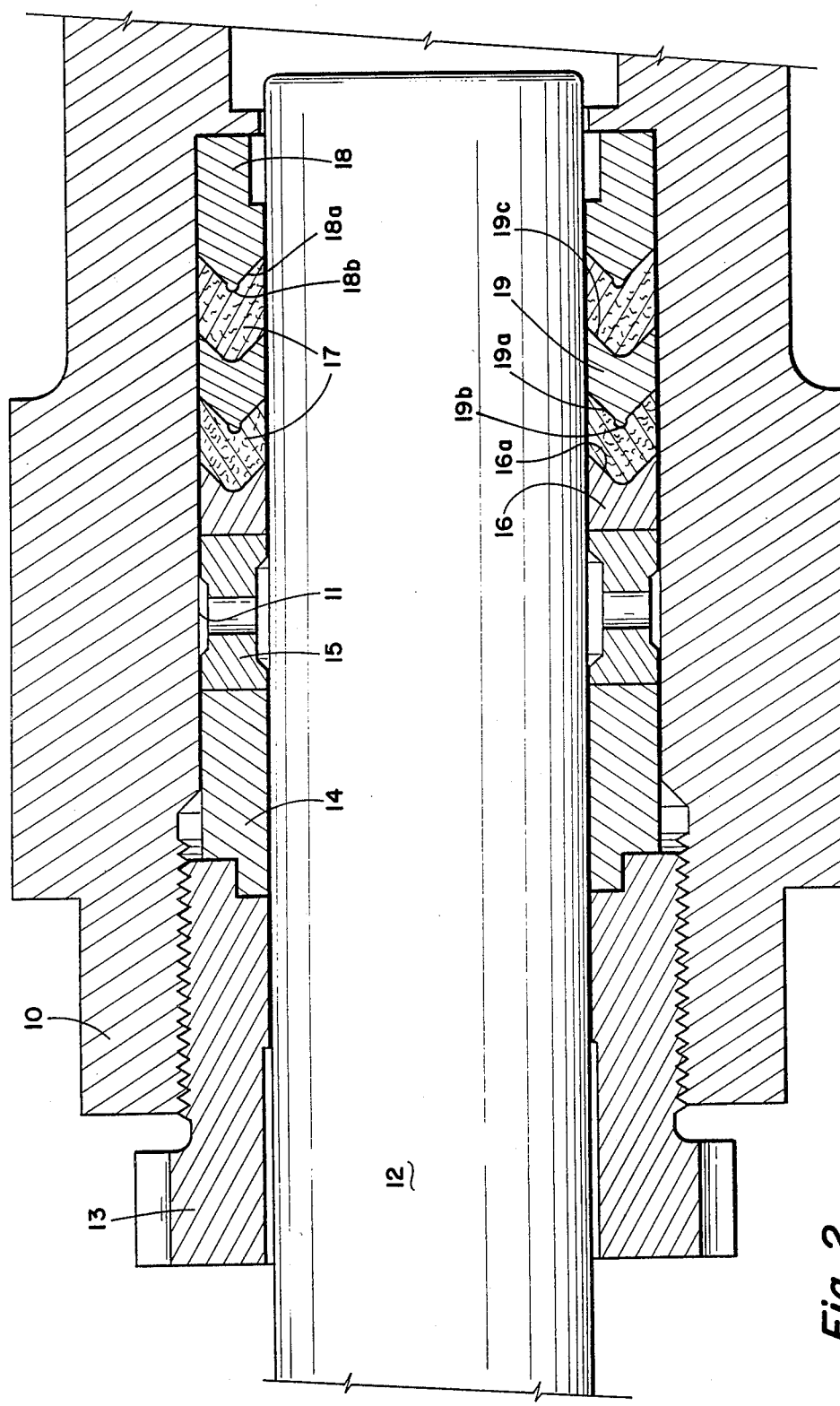
FIG. 2 is a front elevation view of another embodiment of a packing assembly of this invention, which is also installed in the plunger bore of a pump. The packing rings in this assembly are arranged in a separated stack structure.

In FIG. 2, the drawing illustrates a packing assembly in which the packing rings are arranged in a separated stack structure (also referred to in the prior packing assemblies as a "double stack"). The parts which make up this packing assembly are the same as those used in the packing assembly illustrated in FIG. 1, except for a male-female adaptor ring 19, which is not required in the unitary packing ring stack. The parts of the packing assembly in FIG. 2 which are identical to those shown in FIG. 1 are designated with the same reference numerals.

Referring to FIG. 2, a female adaptor ring 16 is positioned between the lubrication gland 15 and the second packing ring 17, such that the concave-shaped front face 16a seats firmly against the convex-shaped rear face of the second packing ring. The male-female adaptor ring 19 is positioned between the two packing rings which make up the separated stack (as indicated by numeral 17). The male-female adaptor ring has a rear face 19a with a convex shape. In addition, at the center of the rear face is an integral rib member 19b, which has a generally convex shape. Another part in this packing assemly is a male adaptor ring 18, which is positioned in front of the first packing ring in the stack. The adaptor ring 18 also has a rear face 18a, with a convex shape, which includes a convex-shaped integral rib member 18b, located at the center of the face.

The angle defined by the concave-shaped front face 16a of the female adaptor ring 16 (like the adaptor ring 16 illustrated in FIG. 1) is 90 degrees, so that the adaptor ring can seat firmly against the rear face of the second ring 17 in the separated stack. The convex-shaped rear face 19a of the male-female adaptor ring 19 defines an angle of 110 degrees, or 120 degrees, and the convex shape of rib 19b matches the central groove in the front face of the second packing ring, so that the adaptor ring can fit tightly against the packing ring. The angle on the concave-shaped front face 19c (like that of the adaptor ring 16), is 90 degrees, so that it conforms to the rear face of the first ring in the stack. The rear face 18a of the male adaptor ring 18 (like the rear face on adaptor 19) is fabricated with an angle of either 110 degrees or 120 degrees, so that it will fit snugly against the front face of the first packing ring.

In the practice of this invention, the adaptor rings are fabricated from brass, but other metal alloys or any material compatible with the environment in which the packing assembly must operate can be used. The unitary stack arrangement of the packing rings is usually employed in a packing assembly when the fluid pressure in the plunger bore is less than about 8,000 psi. When the pressure is between about 8,000 to about 20,000 psi, the separated stack arrangement is preferred. Another factor to consider when choosing the separated stack arrangement, is that in this structure there is less packing material (the lips defined along the bottom edges of the packing rings) in contact with the sliding plunger. Since there is less packing material in contact with the moving plunger, the operating life of the packing is usually noticeably longer than is the case in the unitary stack arrangement.

We claim:

1. A packing assembly which is adapted to be installed in a machine, such as a pump, the machine having a housing with a plunger bore and a plunger therein to provide a fluid-tight seal for the machine, the assembly comprises:

a packing gland which fastens into one end of the plunger bore;

a packing gland spacer positioned adjacent to and in contact with the packing gland;

a lubrication gland positioned adjacent to and in contact with the packing gland spacer;

a separate stack of packing rings, which includes at least two packing rings, each ring in the stack has a front face defining a concave shape, a rear face defining a convex shape, and a groove, defining a concave shape, in the front face;

a female adaptor ring positioned between the lubrication gland and the packing ring stack, the female adaptor ring has a front face with a concave shape, the concave shape defines an angle which substantially conforms to the angle defined by the convex shape of the rear face of the last packing ring in the stack, such that the front face of the female adaptor ring can seat firmly against the rear face of the last packing ring;

a male-female adaptor ring positioned between two packing rings in the stack, the male-female adaptor ring has a front face and rear face, the rear face has a convex shape and an integral rib member defining a convex shape, on said rear face, and the front face has a concave shape:

the convex shape of the rear face of the male-female adaptor ring defines an angle which substantially conforms to the angle defined by the concave shape of the front face of the last packing ring in the stack and the convex shape of the face of the last packaging ring in the stack and the convex shape of the rib member substantially conforms to the concave shape of the groove in the front face of the last packing ring, such that the rear and the integral rib member of the male-female adaptor ring are able to seat firmly against the front face and groove, respectively, of the last packing ring in the stack:

the concave shape of the front face of the male-female adaptor ring defines which substantially conforms to the angle defined by the convex shape of the rear face of the first packing ring in the stack, such that the front face of the male-female adaptor ring can seat firmly against the rear face of the first packing ring;

substantially flat sealing surfaces between the front face and rear face of each of the sealing rings forming seals with the plunger bore and the plunger, a male adaptor ring positioned in front of the first packing ring in the stack, the male adapter ring has a rear face with a convex shape, and an integral rib member, with the convex shape, on said rear face, the convex shape of the rear face of the male adaptor ring defines an angle which exactly conforms to the angle defined by the concave shape of the front face of the first packing ring, and the convex shape of the rib member exactly conforms to the concave shape of the groove in the front face of the first packing ring, such that the rear face and the integral rib member of the male adaptor ring are able to seat firmly against the front face and groove, respectively, of the first packing ring the male adaptor's and male-female adaptor's convex rear shape, their rib members and the complementary front concave faces and grooves of the packing rings forming means for keeping the packing rings concentric with the bore and the sealing surfaces of the packing rings in a sealed relationship with the plunger bore and the bore.

2. The packing assembly of claim 1 in which the concave shape of the front face of the female adaptor ring defines an angle of about 90 degrees.

3. The packing assembly of claim 1 in which the convex shape of the rear face of the male-female adaptor ring defines an angle of from about 110 degrees to 120 degrees, and the concave shape of the front face of the adaptor ring defines an angle of about 90 degrees.

4. The packing assembly of claim 1 in which the convex shape of the rear face of the male adaptor ring defines an angle of about 110 degrees to 120 degrees.

* * * * *